United States Patent
McAvoy et al.

(10) Patent No.: US 7,917,697 B2
(45) Date of Patent: *Mar. 29, 2011

(54) AUTO START CONFIGURATION WITH PORTABLE MASS STORAGE DEVICE

(75) Inventors: Paul McAvoy, San Francisco, CA (US); Fabrice Jogand-Coulomb, San Carlos, CA (US); Pascal Caillon, New York, NY (US); Benjamin Vigier, San Francisco, CA (US); Chieh-Hao Yang, Sunnyvale, CA (US)

(73) Assignee: SanDisk Corporation, Milpitas, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/769,099

(22) Filed: Jun. 27, 2007

(65) Prior Publication Data
US 2009/0006722 A1    Jan. 1, 2009

(51) Int. Cl.
G06F 13/00    (2006.01)
(52) U.S. Cl. ........................... 711/115; 711/154
(58) Field of Classification Search ................. 711/115, 711/154
See application file for complete search history.

(56) References Cited

U.S. PATENT DOCUMENTS

| | | | |
|---|---|---|---|
| 6,807,024 B1 * | 10/2004 | Yokota et al. | 360/60 |
| 7,481,659 B2 * | 1/2009 | Johnson et al. | 439/131 |
| 2003/0004976 A1 * | 1/2003 | Enokida et al. | 707/200 |
| 2003/0041284 A1 * | 2/2003 | Mambakkam et al. | 714/15 |
| 2005/0216651 A1 * | 9/2005 | Tanabiki et al. | 711/100 |
| 2005/0273648 A1 * | 12/2005 | Mambakkam et al. | 714/5 |
| 2006/0149859 A1 | 7/2006 | Dubal et al. | |
| 2007/0288677 A1 * | 12/2007 | Mambakkam et al. | 710/301 |
| 2008/0085032 A1 * | 4/2008 | Cerosaletti et al. | 382/100 |
| 2009/0006721 A1 | 1/2009 | McAvoy et al. | |
| 2009/0177716 A1 | 7/2009 | Bertin | |

FOREIGN PATENT DOCUMENTS

EP    1 178 660 A2    2/2002

OTHER PUBLICATIONS

Notification of Transmittal of the International Search Report and the Written Opinion of the International Searching Authority, or the Declaration for International Application No. PCT/US2008/068269 (Mar. 12, 2009).
Spruill et al., "Tackling the U3 Trend with Computer Forensics," Elsevier, Digital Investigation, vol. 4, pp. 7-12 (Mar. 1, 2007).
Jeschke, "U3-USB-Sticks: Mobile Arbeitsplätze," XP-002517100, TecChannel, pp. 1-19 (May 29, 2006).
Non-Final Official Action for U.S. Appl. No. 11/769,087.
Final Official Action for U.S. Appl. No. 11/769,087 (Mar. 23, 2010).

* cited by examiner

*Primary Examiner* — Reba I Elmore
(74) *Attorney, Agent, or Firm* — Jenkins, Wilson, Taylor & Hunt, P.A.

(57) ABSTRACT

A portable flash memory storage device such as a memory card can configure a host device upon insertion. The configuration may specify applications or other sequences of operations to be executed by the host upon insertion of the card. Files on the card may be associated with an appropriate application and then automatically opened with the appropriate application. A secure configuration may override a more freely modifiable configuration in certain embodiments.

22 Claims, 3 Drawing Sheets

AUTO START CONFIGURATION WITH PORTABLE MASS STORAGE DEVICE

CROSS-REFERENCE TO RELATED APPLICATIONS

This application is related to U.S. patent application Ser. No. 11/769,087, entitled "METHODS OF AUTO STARTING WITH PORTABLE MASS STORAGE DEVICE", filed on the same day as the present application. This application is incorporated in its entirety by reference as if fully set forth herein.

BACKGROUND OF THE INVENTION

Traditionally, flash memory storage devices, such as flash memory cards and flash memory drives, have been used to store user files. For example, flash memory cards are commonly used in digital cameras to store digital photos and in music players to store music files. Flash memory drives with a universal serial bus connector ("USB" flash drives) are typically used to store and transport various user files between computing devices. As the speed of the interface and storage capacity of the devices increases, these devices are also being used to store software programs that may be executed by a host device and/or the processor of the flash device itself.

SUMMARY OF THE INVENTION

One aspect relates to a removable media card. The removable card comprises a flash memory array which comprises a public partition, and the public partition comprises a first group of one or more configuration files specifying device configuration parameters that control the behavior of a portable host device into which the card is inserted. The flash memory array further comprises a secure partition, and the secure partition comprises a second group of one or more configuration files specifying device configuration parameters that control the behavior of the portable device. The media card is configured to sense insertion of the removable media card in a media card receptacle of the portable device, to cause the portable device to read the device configuration parameters of the first and second groups of the removable media card, and to cause an application to be launched by the portable device.

Another aspect relates to providing auto run capability in a host device without native auto-run capability provided as part of the operating system of the host device. In a removable media card, a first group of at least one configuration files is provided at a first designated location, the first group comprising parameters controlling the host behavior when the card is inserted or removed into or from the host device. Upon sensing insertion of the removable media card, the at least one configuration file when read causes the host to associate content on the card with an application of the host, and causes the associated application to be executed by the host device.

DETAILED DESCRIPTION OF THE PREFERRED EMBODIMENTS

Traditionally, flash memory storage devices, such as flash memory cards and flash memory drives, have been used to store user files. For example, flash memory cards are commonly used in digital cameras to store digital photos and in music players to store music files.

Personal computers and other handled devices may incorporate a peripheral connector port such as an IEEE 1394 compliant ("Firewire") connector, USB connector or other high speed peripheral connector. Flash memory drives are a convenient vehicle for storing and transporting user files between these types of computing devices. As the speed of the interface and storage capacity of the devices increases, these devices are also being used to store software programs that may be executed by a host device alone and/or the processor of the flash device itself.

Once a portable flash memory storage device such as a memory card is inserted into a computing device, it is desirable to automatically run an application associated with a file residing on the card or an application residing on the card. For example, an application is typically associated with a file by the file extension. While Microsoft Windows® operating systems have an auto run capability, many other devices do not. Many computing devices, especially handheld computing devices, cannot automatically run applications present on a removable flash memory storage device. For example, Linux devices, Symbian devices, some mobile phones, and special purpose devices such as GPS units either cannot run or have limited support for auto start of a necessary or desired application.

Additionally, existing auto run capability lacks protection against potentially malicious executables that can be set to automatically run upon insertion.

Figure 1:
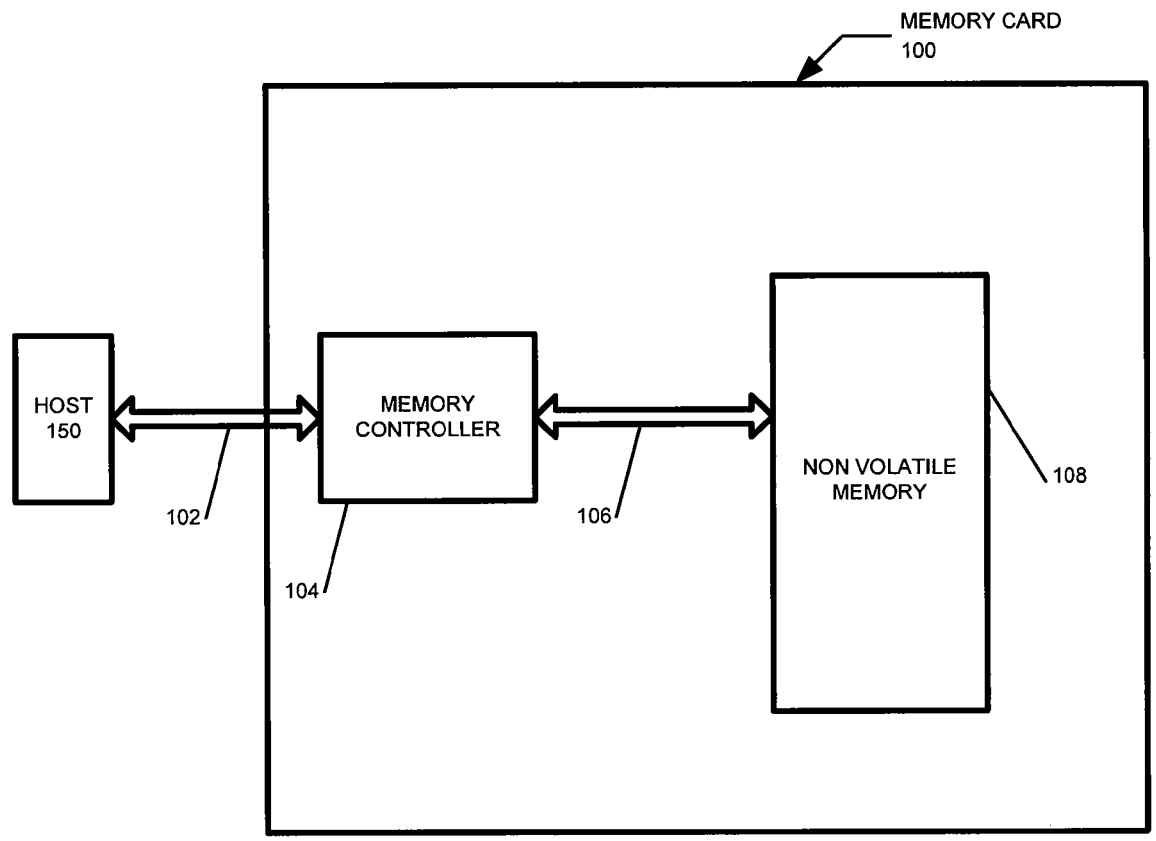
FIG. 1 is a block diagram of flash memory card 100, a type of non volatile storage device according to an embodiment of the present invention.

FIG. 1 illustrates memory card 100, an embodiment of a non volatile storage device. Flash memory card 100 communicates with host 150 via host interface 102. In the case of a memory card, host interface 102 comprises a group of contacts that make contact with the contacts of a memory card receptacle within the host. Host interface 102 may also comprise the drive circuitry and software that control host communications. Memory card 100 also comprises non volatile flash memory 108, memory controller 104, and control and communication lines 106. Memory controller 104 controls the read/write operations of memory 108 and communications with host 150.

Figure 2:
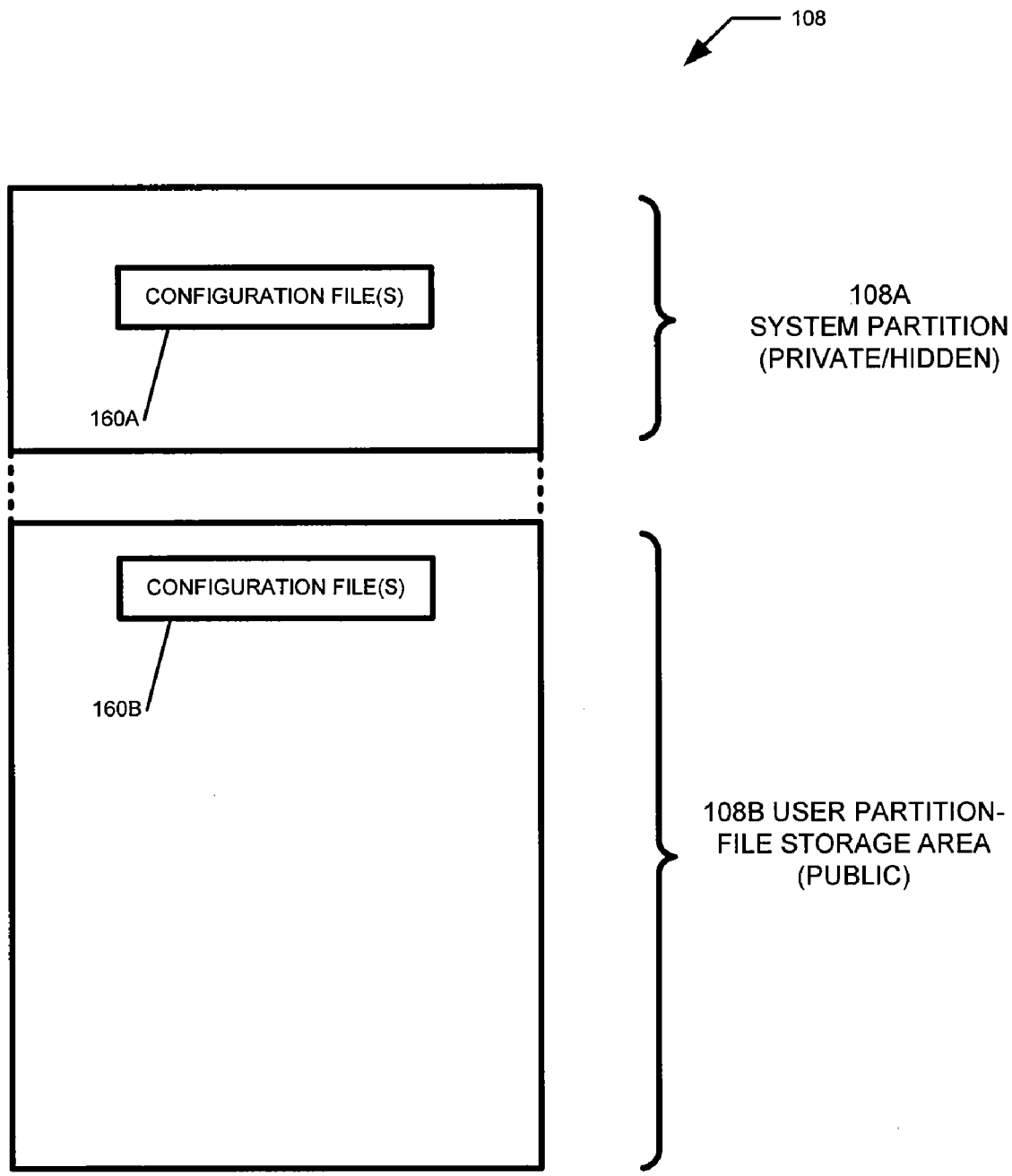
FIG. 2 is a block diagram of non volatile memory 108 of FIG. 1.

FIG. 2 illustrates the memory space within flash memory 108. Flash memory 108 may comprise numerous partitions. Certain of the partitions may be hidden from and inaccessible to host computers, while others are available. These partitions are also referred to as private partitions. System partition 108A is a hidden or private partition. Operating firmware and other overhead data used by the memory controller to run device 100 are typically located in system partition 108A. One or more host configuration files 160A are stored in a private partition of memory 108 such as the system partition 108A. As such, configuration files 160A cannot be accessed and altered by a host computer and any entity wishing to alter the files themselves and the host configuration specified by the files. Configuration files 160A may be thought of therefore as private configuration files. Partitions whose contents cannot be accessed and/or altered by an entity other than the memory card may be referred to as secure partitions.

One or more configuration files 160B are stored within user partition 108B. User partition 108B is generally used to store user files such as documents, photos, music, and software applications. At least one configuration file is preferably located in a designated place such as in the root directory of the device. User partition 108B is freely accessible to host computers. Files in the user partition may therefore be freely modified or substituted. In the case of configuration files 160B, this means that the configuration of the host can be easily changed. While this may be desirable in some environments, in certain scenarios this may compromise the security of the host. For example, a parameter within the configuration files (160A or 160B) may cause the host to run a malicious or harmful executable.

Features of the configuration file include the definition of sections, key value pairs, platforms, system differentiation and variation differentiation within operating systems, variable (key) substitution, and file type association with applications. For example, the configuration file may specify what music player application will be used to play music files. As a memory card may be inserted into many different types of hosts, the music application may vary with the host. For example, the specified music application that runs on a handheld device with an ARM processor running Windows CE may be different than the specified music application for a Symbian machine, Linux machine etc. The applications may also be unique to the host device for special purpose devices such as GPS's etc.

The insertion of the card and the configuration files may trigger any number of actions that make using the host device a better experience for the user. As an example the insertion and configuration files may trigger the automatic starting of: applications; a menu of user selectable items; media playback; and other sequences of operations.

In an example where a menu of user selectable items is available, a user may select an option from the menu (that was automatically launched) that launches a web browser from the menu. The selected option may also trigger the start of another application and/or process on the host device. The selected option may also further trigger the opening of a file browser/manager so that the user may view the contents of the card. The file browser/manager may display the root directory or another specified location. The selected option may also trigger closing of the menu or presentation of additional menus for the user to further select from.

Figure 3:
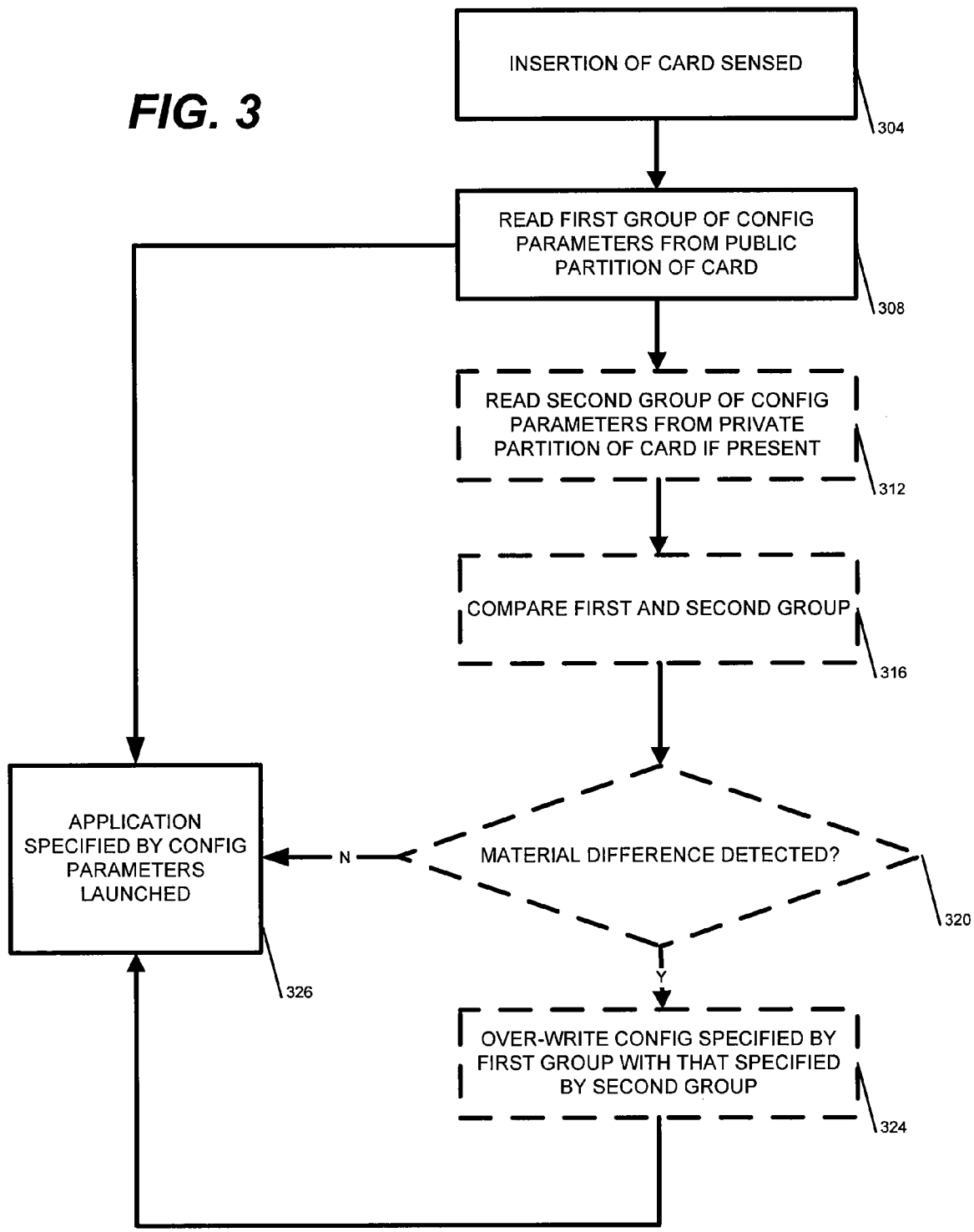
FIG. 3 is a flow chart of an auto start process, according to an embodiment of the present invention.

FIG. 3 is a flow chart of an auto start process, according to an embodiment of the present invention. In step 304, the insertion of the memory card is sensed by the device and/or card. Next, in step 308, the host device will read a first group of configuration parameters from a public partition of the card. The host will typically have a support library which loads the configuration files having the parameters. Typically this library will be called when the device gets a card-insert notification via interrupt or some other physical trigger. The first group of parameters may specify an application to be executed by the host, and that application may then be launched, as shown in step 326. Alternatively, before proceeding to step 326, the host will read a second group of configuration parameters from a private partition of the card, as seen in step 312. The second group of configuration parameters would be contained in one or more configuration files, these files and the parameters specified therein would not be publicly accessible outside of the card, and are therefore far more secure to configurations that may specify execution of a malicious application or any other undesirable configuration.

In step 316, the host will compare the first and second groups of configuration files. As seen in step 320, if no material difference is detected, an application or applications specified by the configuration as set by either of the first or second groups will then be launched by the host in step 326.

If however, a material difference is detected in step 320, the configuration specified by the first group will then be overwritten by a configuration specified by the second group. The threshold for materiality may differ in various embodiments and devices/platforms, but at a minimum it ensures that differences in form/formatting but not in content shall not be considered material. This provides a mechanism to prevent against the specification of undesirable configurations. Use of this mechanism can also provide for some level of user changes up to a threshold beyond which user specified configuration changes will not be accepted, and the configuration will revert to the configuration specified by the configuration in the private partition. The configuration in the private partition may be modified by the card in conjunction with the host, only by authorized users, or may alternatively not be modifiable except by the supplier of the card.

Additionally, the second configuration files may completely override all options in the public configuration. It is at the discretion of the host device which configuration option(s) to override. Additionally, the host determines which configuration files to read and which configuration options in those files to use. For example, in the situation where the host is a mobile telephone, the mobile network operator for the telephone may also dictate or specify which configuration files to read and which configuration options in those files to use.

What is claimed is:

1. A removable media card, comprising:
a flash memory array comprising a public partition, the public partition comprising a first group of one or more configuration files comprising device configuration parameters that control the behavior of a portable device; and
the flash memory array further comprising a secure partition, the secure partition limiting access by the portable device to the configuration parameters stored in the secure partition, the secure partition comprising a second group of one or more configuration files comprising device configuration parameters that control the behavior of the portable device;
the media card configured to sense insertion of the removable media card in a media card receptacle of the portable device, to cause the portable device to read the device configuration parameters of the first and second groups of the removable media card, to determine whether to launch an application based on the existence of a relationship between the configuration parameters of the first group and the configuration parameters of the second group, and, in response to a determination to launch the application, to cause the application to be launched by the portable device.

2. The removable media card of claim 1, wherein the card is configured to trigger the portable device to determine differences between the first and second group of configuration files.

3. The removable media card of claim 2, wherein the card is further operable to over-ride a configuration specified by the first group with a configuration specified by the second group if any material differences are detected.

4. The removable media card of claim 2, wherein the removable media card is an SD type card.

5. The removable media card of claim 1, wherein the card is further configured to generate a menu of user selectable items when the application is launched.

6. The removable media card of claim 1, wherein the card is further operable to trigger playback of audio and/or visual content stored on the removable media card when the application is launched.

7. The removable media card of claim 1, wherein a configuration specified by one or more of any of the configuration files is dependent on an operating system of the portable device.

8. The removable media card of claim 1, wherein a configuration specified by one or more of any of the configuration files is dependent on the hardware of the portable device.

9. The removable memory card of claim 1, wherein the secure partition having limited access by the portable device comprises one of:
 a partition that is hidden from the portable device;
 a partition that is inaccessible by the portable device;
 a partition that the portable device can read but cannot write;
 a partition that is readable only with authorization; and
 a partition that is writeable only with authorization.

10. A removable memory card comprising:
 a flash memory array, the flash memory array comprising at least one secure area;
 a memory controller that controls read/write activity of the card and restricts access by an entity other than the memory controller to the at least one secure area; and
 means for causing a host device without native auto-run capability provided as part of the operating system to associate content stored within the flash memory array with an appropriate application of the host device and to thereafter automatically run the application of the host device upon insertion of the card into the host device.

11. The removable memory card of claim 10, further comprising means for configuring a host device in which the card is inserted, said means comprising a mechanism within the at least one secure area for overriding a configuration specified by information in a non secure area of the flash memory array.

12. A removable memory card comprising:
 a first group of at least one configuration files at a first designated location, the first group comprising parameters controlling the host behavior when the card is inserted into or removed from a host device;
 a second group of a at least one configuration files at a second designated location, the second group comprising parameters controlling a behavior of the host device when the card is inserted into or removed from the host device,
 the first designated location within a public partition of the memory card, the second designated location within a private partition of the memory card, the private partition having limited access by the host device; and
 the insertion of the card into the host device configured to cause the host device to read the at least one of the configuration files, one of the configuration files specifying an application to be launched by the host device.

13. The flash memory card of claim 12, wherein the card is configured to read both the first and second groups of configuration files.

14. The flash memory card of claim 13, wherein the card is operable to compare the first and second group of configuration files.

15. The flash memory card of claim 13, wherein a configuration specified by the second group of configuration files overrides that of the first group of configuration files in the event that the configuration specified by the two groups differs.

16. The flash memory card of claim 13, wherein a configuration specified by the second group of configuration files overrides, at least in part, a pre-existing configuration of the host.

17. The flash memory card of claim 12, wherein the first designated location is within a root directory.

18. The flash memory card of claim 12, wherein a configuration specified by the at least one configuration file is specific to the operating system of the host device.

19. The flash memory card of claim 12, wherein a configuration specified by the at least one configuration file is specific to the hardware of the host device.

20. The flash memory card of claim 12, wherein the card is configured to cause the host device to associate a file type of a file residing on the memory card with an application appropriate to execute or render the file.

21. The flash memory card of claim 12, wherein the one or more configuration files comprise key value pairs.

22. The flash memory card of claim 12, wherein the one or more configuration files allow for key value substitution.

* * * * *